United States Patent
Tajima et al.

(10) Patent No.: US 6,682,093 B2
(45) Date of Patent: Jan. 27, 2004

(54) AIR BAG DEVICE

(75) Inventors: Koh Tajima, Nishikasugai-gun (JP);
Yasushi Okada, Nishikasugai-gun (JP);
Michihisa Asaoka, Nishikasugai-gun (JP); Yuji Kuriyama, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 31 days.

(21) Appl. No.: 10/015,638

(22) Filed: Dec. 17, 2001

(65) Prior Publication Data
US 2002/0089155 A1 Jul. 11, 2002

(30) Foreign Application Priority Data

Dec. 19, 2000 (JP) .................................. P 2000-385274

(51) Int. Cl.$^7$ ................................................ B60R 21/16
(52) U.S. Cl. .................. 280/732; 280/728.3; 280/728.2
(58) Field of Search .......................... 280/728.1, 728.2, 280/728.3, 730.1, 732

(56) References Cited

U.S. PATENT DOCUMENTS

| | | | | |
|---|---|---|---|---|
| 4,903,986 A | * | 2/1990 | Cok et al. .................. | 280/728.2 |
| 5,096,220 A | * | 3/1992 | Nakajima ................... | 280/728.3 |
| 5,221,108 A | * | 6/1993 | Hirabayashi ............... | 280/728.3 |
| 5,242,192 A | * | 9/1993 | Prescaro et al. .......... | 280/730.1 |
| 5,275,435 A | * | 1/1994 | Fischer ...................... | 280/743.1 |
| 5,306,039 A | * | 4/1994 | Nakayama ................. | 280/728.2 |
| 5,348,343 A | * | 9/1994 | Hawthorn ................. | 280/730.1 |
| 5,492,367 A | * | 2/1996 | Albright et al. .......... | 280/743.1 |
| 5,496,056 A | * | 3/1996 | Dyer ......................... | 280/728.1 |
| 5,564,739 A | * | 10/1996 | Davidson .................. | 280/736 |
| 5,630,614 A | | 5/1997 | Conlee et al. ............. | 280/730 |
| 5,772,239 A | * | 6/1998 | Seymour .................. | 280/728.3 |
| 5,823,567 A | * | 10/1998 | Behr et al. ................ | 280/743.1 |
| 6,099,026 A | * | 8/2000 | Ando et al. ............... | 280/728.3 |
| 6,131,944 A | * | 10/2000 | Henkel et al. ............ | 280/728.3 |
| 6,142,507 A | * | 11/2000 | Okuda et al. ............. | 280/730.2 |
| 6,499,765 B2 | * | 12/2002 | Hawthorn et al. ........ | 280/743.1 |

FOREIGN PATENT DOCUMENTS

| | | | |
|---|---|---|---|
| DE | 19705829 C1 | * | 5/1998 |
| JP | 8-268198 | * | 10/1996 |
| JP | 10-315889 | | 12/1998 |
| JP | 11-240401 | * | 9/1999 |
| JP | 2000-153745 | * | 5/2000 |
| JP | 2000-247199 | | 9/2000 |

* cited by examiner

Primary Examiner—Paul N. Dickson
Assistant Examiner—George D. Spisich
(74) Attorney, Agent, or Firm—Posz & Richards, PLC (57) ABSTRACT

In an air bag device, a folded air bag is accommodated in a condition that the air bag is enclosed by a sheet for preventing the air bag 11 unfolded. The sheet has a regulation wall portion which covers an upper surface of the air bag on the side from which the air bag projects at the time of expansion. The regulation wall portion is provided with a breakable portion which can be ruptured by being pressed by the air bag at the time of expansion of the air bag. Further, the breakable portion is provided so as to be ruptured from one edge side (left edge side) of the circumferential edge sides of the regulation wall portion to the right edge side through the vicinity of the center.

4 Claims, 9 Drawing Sheets

AIR BAG DEVICE

CROSS REFERENCE TO RELATED APPLICATION

The present invention is based on Japanese Patent Application No. 2000-385274, the entire contents of which are incorporated herein by reference.

BACKGROUND OF THE INVENTION

1. Field of the Invention

The present invention relates to an air bag device to be mounted on a vehicle, and particularly to an air bag device in which a folded air bag is enclosed by a sheet for preventing the air bag from unfolding when in a non-deployed state.

2. Description of Related Art

Conventionally, an air bag device, for example, an air bag device for an assistant seat was constituted by an air bag accommodated in a folded state, an inflator for supplying expansion gas to the air bag, a casing for receiving and holding the air bag and the inflator, and a cover for covering the folded air bag. The folded air bag was accommodated in the casing and enclosed within a sheet for preventing the air bag from unfolding when in a non-deployed state (see JP-A-10-315889).

The sheet disclosed in the above publication was a material used to enclose the folded air bag so that the air bag was not restored to an unfolded state when the air bag device having the air bag accommodated in the casing was assembled. Further, this sheet had a breakable portion formed by slits so that the sheet was ruptured in case of development and expansion of the air bag against the passenger. While being formed to be offset from the center to the left and right edges of the sheet respectively, the slits were arranged uniformly on the left and right sides of the sheet, so that the air bag could be developed faster on the left and right sides of the sheet than the center side in the vehicle, and developed and expanded in a large area against the passenger in case of development and expansion of the air bag.

In the above air bag device, however, if during deployment the air bag interfered with a passenger sitting in a normal position, the pressing force against the passenger per unit area could be reduced because the air bag interfered with the passenger across a large area. There was however room for improvement in reducing the total pressing force of the air bag against the passenger.

SUMMARY OF THE INVENTION

It is an object of the present invention to provide an air bag device in which the pressing force against a passenger in case of development and expansion of the air bag can be reduced even when the passenger sits in a normal position.

According to the present invention, there is provided an air bag device constituted by: an air bag which is folded and accommodated; a sheet for enclosing the air bag in a folded state so as to prevent the unfolding of the airbag; a regulation wall portion formed by the sheet and covering a surface of the air bag on a side from which the air bag projects in case of expansion of the air bag; and a breakable portion provided in the regulation wall portion so that the breakable portion can be ruptured while being pushed by the air bag in case of the expansion; wherein the breakable portion is disposed so as to be ruptured from one of circumferential edge sides of the regulation wall portion.

Preferably, the breakable portion is disposed so that the breakable portion is ruptured from a left or right edge side of the regulation wall portion mounted on a vehicle when the air bag is expanded.

In this case, preferably, the breakable portion is formed by a slit provided in the regulation wall portion, the slit being offset to the left or right edge side which is a rupture initiation side.

Further, in this case, preferably, the folding of the air bag is completed when folded portions of the air bag extending in the left-right direction are folded and superimposed onto a center part of the air bag, and one of the left folded portion and the right folded portion, as a rupture initiation side in the regulation wall portion, is folded and superimposed on the other one of the left folded portion and the right folded portion.

Further, in this case, preferably, the sheet is provided with an auxiliary wall portion which is connected to the regulation wall portion and which covers a surface of the air bag on a side perpendicular to the side from which the air bag projects, and the auxiliary wall portion is connected to an edge side of the regulation wall portion in opposition to the rupture initiation side.

In the air bag according to the present invention, the regulation wall portion of the sheet is disposed to cover a surface of the air bag on the side from which the air bag projects in case of expansion of the air bag, and the breakable portion is disposed in the regulation wall portion so as to be ruptured from one of the circumferential edge sides of the regulation wall portion. Therefore, the air bag in the initial stage of development and expansion does not project from the center of the regulation wall portion but projects from one of the circumferential edge sides of the regulation wall portion which is the rupture initiation side, while the folding of the air bag is canceled. On this occasion, the air bag projects in the condition that the folding of the air bag on the side opposite to the rupture initiation side in the breakable portion has not been cancelled yet, so that the air bag projects not against the passenger but in a bent state so that the air bag is pulled toward the side opposite to the rupture initiation side in the breakable portion.

Therefore, even if the passenger sits in a normal position, the air bag in the initial stage of development and expansion projects in a bent state toward the right or left side of the passenger, that is, the air bag projects so as to avoid directly impacting the passenger. Thus, the air bag does not impose large pressing force on the passenger sitting in a normal position.

Of course, in the case where the passenger sits in the proper or normal position, the air bag expands toward to the passenger after rupture of the breakable portion in the regulation wall portion is completed and the air bag is fully deployed. Hence, the air bag can restrain the passenger accurately in the condition that the development and expansion of the air bag is completed.

Accordingly, in the air bag device according to the present invention, even if the passenger sits in the normal position, the pressing force against the passenger at the time of development and expansion of the air bag can be reduced. Further, the member providing the operations and effects as described above is a constituent component of the background-art air bag device, that is, the sheet for preventing the air bag from unfolding when in a non-deployed state so that the air bag device according to the present invention can be produced very conveniently.

Preferably, if the breakable portion of the regulation wall portion is disposed so as to be ruptured from the left or right edge side of the regulation wall portion mounted on the vehicle when the air bag is expanded, the air bag in the initial stage of the development and expansion projects toward the right or left side of the passenger seating in front of the normal position so as to avoid directly impacting the passenger, so that the fear that the air bag interferes with the passenger can be reduced compared with the case in which the air bag projects toward the upper side rather than toward the passenger.

In this case, if the breakable portion is formed by a slit offset to the left or right edge side, which is the rupture initiation side, of the regulation wall portion, the slit is simply disposed in the regulation wall portion so that the breakable portion can be formed easily by forming a rift by a cutter or the like, in comparison with the case where the breakable portion is formed by stitching by use of threads or the like.

Further, the folded portion folded and superimposed on the upper side projects first when the air bag is developed and expanded. At that time, the folded portion folded and superimposed on the upper side is ruptured rapidly from the rupture initiation side of the regulation wall portion. Thus, the mode in which the air bag projects from one of the circumferential edge sides of the regulation wall portion in a bent state so as to avoid directly impacting the passenger can be ensured.

Still further, if the sheet is provided with an auxiliary wall portion which is connected to the edge side opposite to the rupture initiation side in the regulation portion and which covers a surface of the air bag on the side perpendicular to the side from which the air bag projects, the air bag is restricted by the auxiliary wall portion in the initial stage of development and expansion so as not to project toward the side opposite to the rupture initiation side in the regulation wall portion, and the mode in which the air bag projects from one of the circumferential edge sides of the regulation wall portion in a bent state so as to avoid directly impacting the passenger can be ensured.

Furthermore, in the air bag device, the sheet may be provided as a woven cloth with a lattice pattern. The woven cloth may be oriented so as to form a bias angle with respect to the breakable portion formed as a slit.

DETAILED DESCRIPTION OF THE PREFERRED EMBODIMENTS

Hereunder, an embodiment of the present invention will be described on the basis of the drawings.

Figure 1:
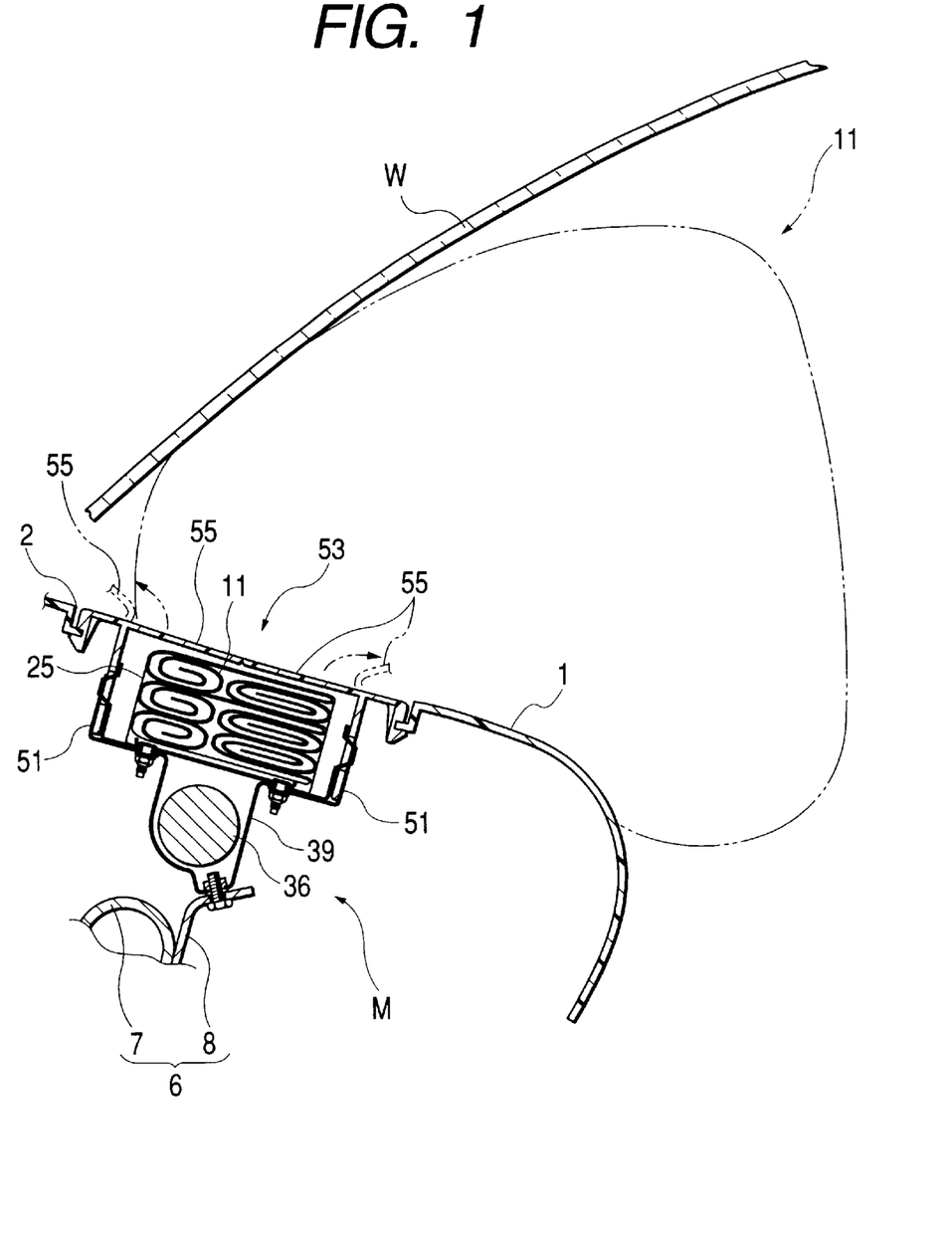
FIG. 1 is a vertical section in the front-rear direction of a vehicle showing the condition of use of an air bag device for a passenger seat as an embodiment of the present invention, corresponding to I—I portion in FIG. 3.
Figure 2:
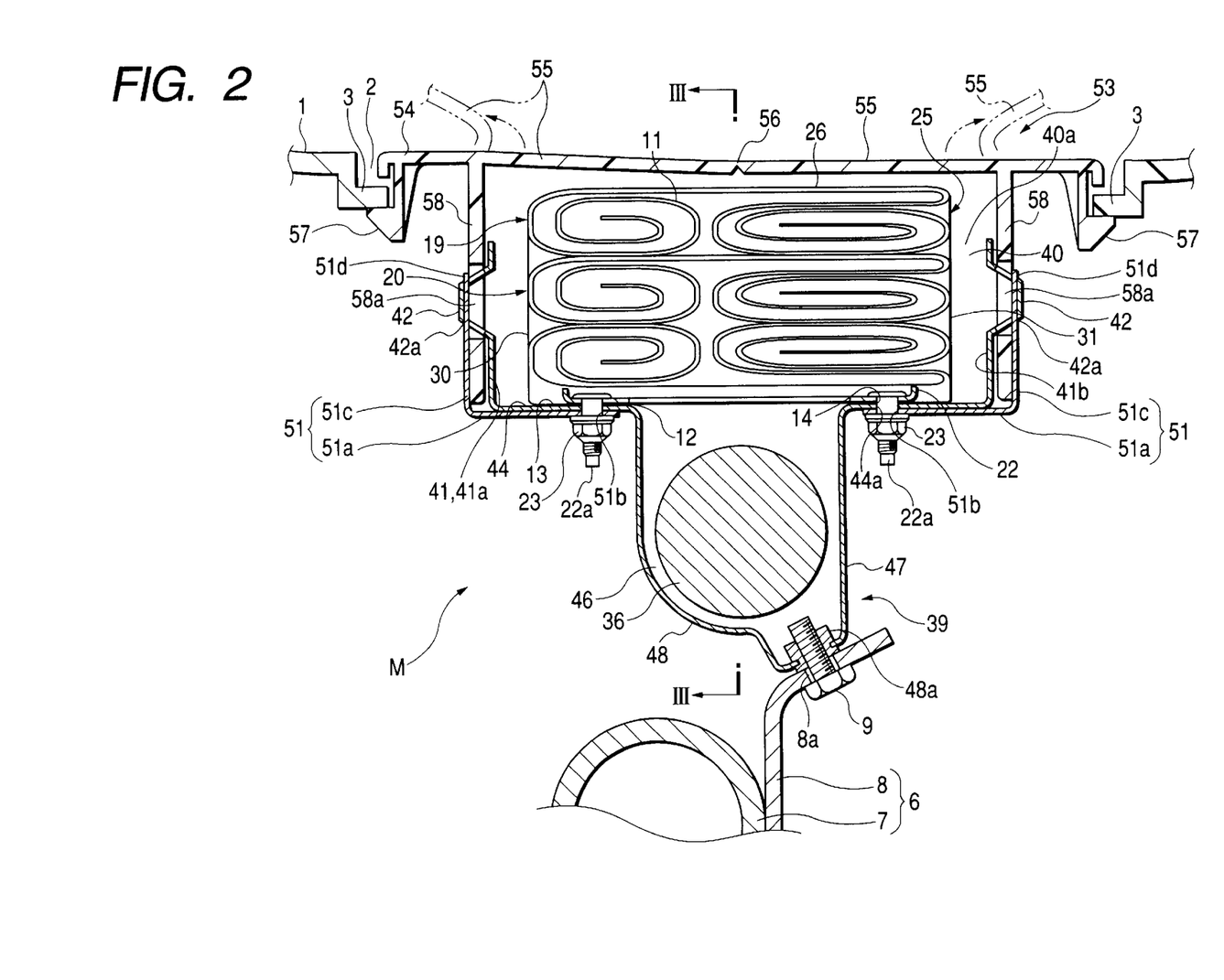
FIG. 2 is an enlarged vertical section of the same embodiment of FIG. 1.
Figure 3:
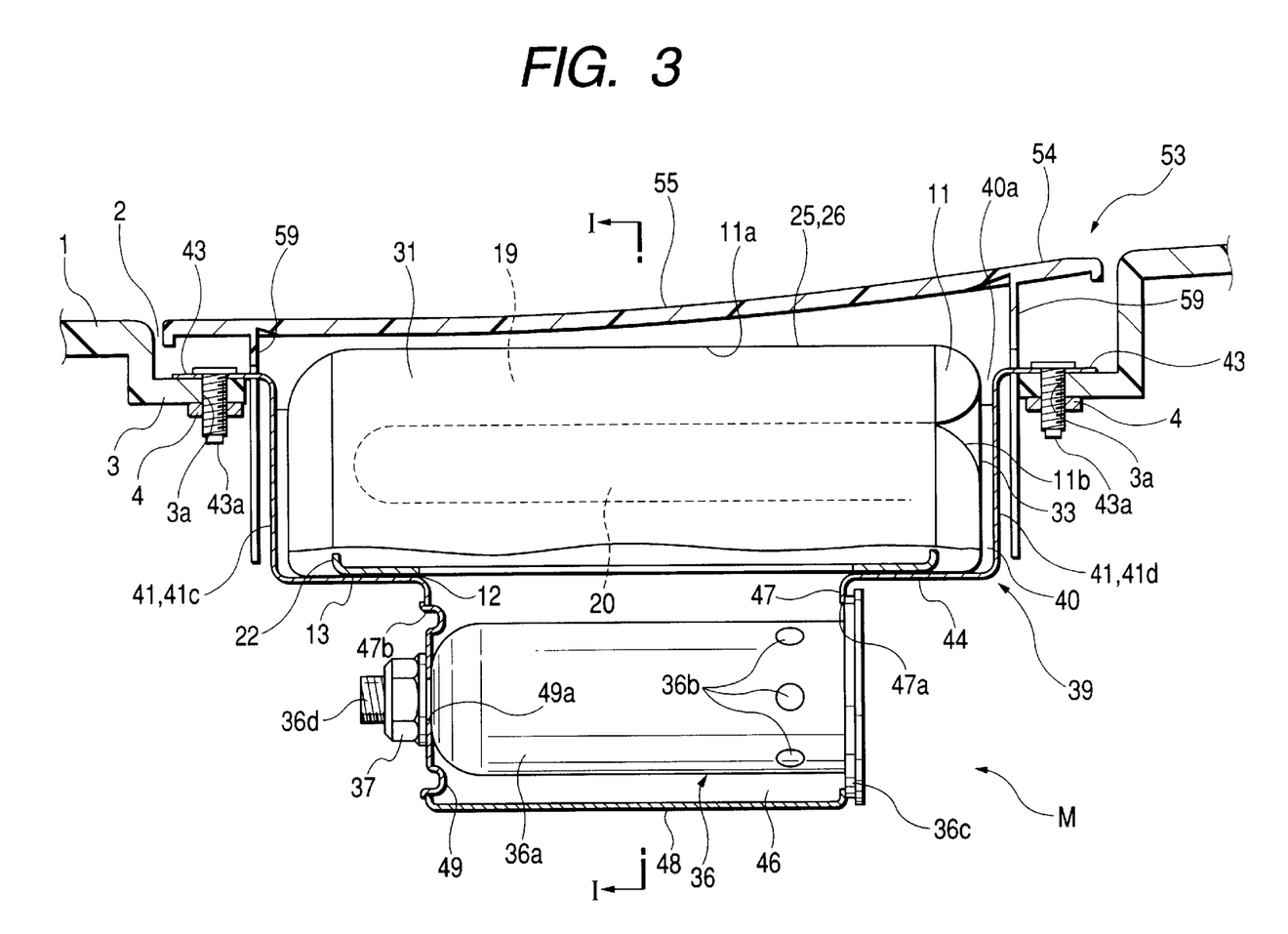
FIG. 3 is a vertical section in the left-right direction of the vehicle, showing the condition of use of the air bag device for a passenger seat in the same embodiment, corresponding to III—III portion in FIG. 1.

An air bag device M in the embodiment is an air bag device M for a passenger seat which is arranged in an instrument panel 1 in front of the passenger seat, as shown in FIGS. 1 through 3. The assistant seat air bag device M is constituted by a folded air bag 11, an inflator 36 for supplying the air bag 11 with expansion gas, a casing 39 for receiving and holding the air bag 11 and the inflator 36, a cover 53 for covering the folded air bag 11, two pressing members 51 for fixedly connecting the cover 53 to the casing 39, and a sheet 25 for preventing the air bag 11 from unfolding when in a non-deployed state.

The air bag 11 is shaped like a bag having a rectangular opening 12 (see FIG. 8A) so as to make the expansion gas flow into the low portion of the bag, and the air bag 11 is formed from woven cloth of polyester, polyamide, or the like. A plurality of attachment holes 14 (the number of the holes is 6 in this embodiment) for attaching the air bag 11 to the casing 39 are formed in a peripheral edge 13 of the opening 12. The attachment of the air bag 11 to the casing 39 is performed by use of a rectangular and annular metal plate retainer 22 as shown in FIGS. 1 through 4. The retainer 22 has a plurality of bolts 22a extending downward (in the embodiment, three bolts are provided in each of opposite portions on front and rear sides of the vehicle). The respective bolts 22a are inserted into attachment holes 14 and through holes 44a of the casing 39. The peripheral edge 13 of the opening 12 is pressed by the retainer 22, and nuts 23 are thread-engaged with the bolts 22a so that the air bag 11 is connected to the casing 39.

The inflator 36 is of a cylinder type and is constituted by a substantially columnar body 36a having a plurality of gas delivery ports 36b capable of exhausting the expansion gas at its one end side, a flange portion 36c provided at one end side of the body 36a, a bolt portion 36d provided at the other end side of the body 36a.

The cover 53 is formed from thermoplastic elastomer or the like such as polyolefin group, polyester group or the like. The cover 53 is constituted by a ceiling wall portion 54 arranged so as to close a rectangular opening 2 of the instrument panel 1, and side wall portions 58 and 59 substantially rectangular cylindrical and extending downward from the lower surface of the ceiling wall portion 54.

In the ceiling wall portion 54, a breakable portion 56 thinned in its periphery is disposed in the inner side surrounded by the side wall portions 58 and 59 so that two door portions 55 and 55 are provided. The breakable portion 56 is formed substantially like a shape H when the portion 56 is viewed from above the ceiling wall portion 54. When the breakable portion 56 is pressed by the expanded air bag 11 to be ruptured at the time of expansion of the air bag 11, the door portions 55 and 55 are opened in the front-rear direction of the vehicle as double doors are opened as shown by the chain double-dashed line in FIGS. 1 and 2. Further, lock legs 57 projecting downward are formed on the front and rear edges of the ceiling wall portion 54 in the vehicle. The lock legs 57 are locked on the lower surface of the flange portion 3 which has been provided to have steps in the circumferential edge of the opening 2 of the instrument panel 1.

The side wall portions 58 are provided in the front and rear portions of the vehicle, while the side wall portions 59 are provided in the right and left portions of the vehicle. In each of the side wall portions 58, a plurality of lock holes 58a (three lock holes in this embodiment) are formed so as to penetrate the side wall portion 58 in the front-rear direction of the vehicle.

Each of the pressing members 51 is formed from a metal plate, and constituted by a horizontal plate portion 51a and a vertical plate portion 51c extending upward from an end portion of the horizontal plate portion 51a so as to have an L-shape in section. The pressing members 51 are disposed in portions of the casing 39 in the front-rear direction of the vehicle. In each of the horizontal plate portions 51a, through holes 51b are formed so that the bolts 22a of the retainer 22 can be inserted into the through holes 51b respectively. In each of the vertical plate portions 51c, in the upper end thereof, insertion portions 51d are formed like comb teeth so that the inserting portions 51d can be inserted into inserted portions 42a, which will be described later, of the casing 39.

The casing 39 is constituted, as shown in FIGS. 1 through 4, by an upper chamber 40 having a rectangular parallelepiped shape with top end opened, and a lower chamber 46 disposed at a lower portion side of the casing 39 so as to communicate with the upper chamber 40.

The upper chamber 40 is constituted by a circumferential wall portion 41 having a substantially rectangular cylindrical shape, and a bottom wall portion 44 disposed under the circumferential wall portion 41. The circumferential wall portion 41 is constituted by front and rear side wall portions 41a and 41b and left and right side wall portions 41c and 41d. The front and rear side wall portions 41a and 41b are disposed in opposition to each other in the front-rear direction of the vehicle, while the left and right side wall portions 41c and 41d are disposed in positions in opposition to each other in the left-right direction of the vehicle. In the front and rear side wall portions 41a and 41b, lock protrusions 42 to be inserted into the lock holes 58a of the cover side wall portions 58 are provided so as to project to the outside. In each of the lock protrusions 42, an insertion hole 42a is formed so as to penetrate in the up/down direction, in a portion where the lock protrusion 42 is projected outside from the side wall portions 58 when the lock protrusions 42 are inserted into the lock holes 58a.

In the left and right side wall portions 41c and 41d, at upper ends, flange portions 43 are formed so as to project outward. The flange portions 43 act to make the casing 39 connect to the instrument panel 1, and the flange portions 43 are provided with attachment bolts 43a extending downward. In the flange portions 43, the attachment bolts 43a are inserted into connection holes 3a formed in the flange portion 3 in the circumferential edge of the instrument panel opening 2 so that the bolts 43a are thread-engaged with nuts 4. Accordingly, the flange portions 43 are connected to the flange portion 3 of the instrument panel. The respective lower ends of the side wall portions 41a, 41b, 41c and 41d extend toward the inside to thereby form the bottom wall portion 44. In the portions of the bottom wall portion 44 in the front-rear direction of the vehicle, through holes 44a are formed so that the bolts 22a of the retainer 22 can be inserted into the through holes 44a respectively. In this case, the horizontal plate portions 51a of the pressing members 51 are made to abut on the lower surfaces of the bottom wall portion 44 in the front-rear direction of the vehicle.

The lower chamber 46 is constituted by: a circumferential wall portion 47 which extends downward from the inside end portion of the bottom wall portion 44 and which is substantially rectangular cylindrical; and a bottom wall portion 48 which closes the lower end of the circumferential wall portion 47. Holding holes 47a and 47b for holding the inflator 36 are formed in the positions opposite to each other in the circumferential wall portion 47 in the left-right direction of the vehicle. The holding holes 47a and 47b are made equal to each other in inner diameter, and has a size such that the body 36a of the inflator 36 can be inserted through the holding holes 47a and 47b but the flange portion 36c cannot be inserted therethrough.

Further, a disc like patch 49 is provided on one of the holding holes 47a and 47b (the holding hole 47b in the embodiment). By using the patch 49 and a nut 37, the inflator 36 is accommodated and held in the casing 39. The patch 49 has an outer diameter larger than the inner diameter of each of the holding holes 47a and 47b. In the center of the patch 49, a through hole 49a is formed so that the bolt portion 36d of the inflator 36 can be inserted through the through hole 49a.

The inflator 36 is accommodated and held in the casing 39 as follows. The bolt portion 36d side is inserted into the holding hole 47a of the casing 39 so as to project out from the holding hole 47b. The bolt portion 36c is made to abut against the circumferential edge of the holding hole 47a. Further, the patch 49 is made to abut against the circumferential edge of the holding hole 47b, while the bolt portion 36d is projected from the through hole 49a. Then, if the nut 37 is threaded onto the bolt portion 36d, the inflator 36 can be accommodated and held in the lower chamber 46 of the casing 39.

Further, an attachment nut 48a for attaching the casing 39 to the body 6 is fixed on the bottom wall portion 48 of the casing lower chamber 46. The bottom wall portion 48 is attached to a bracket 8 which extends from a reinforcement 7 on the body 6 side. That is, if a bolt 9 is thread-engaged, through a connection hole 8a formed in the bracket 8, with the nut 48a, the bottom wall portion 48 can be attached on the bracket 8.

Figure 4:
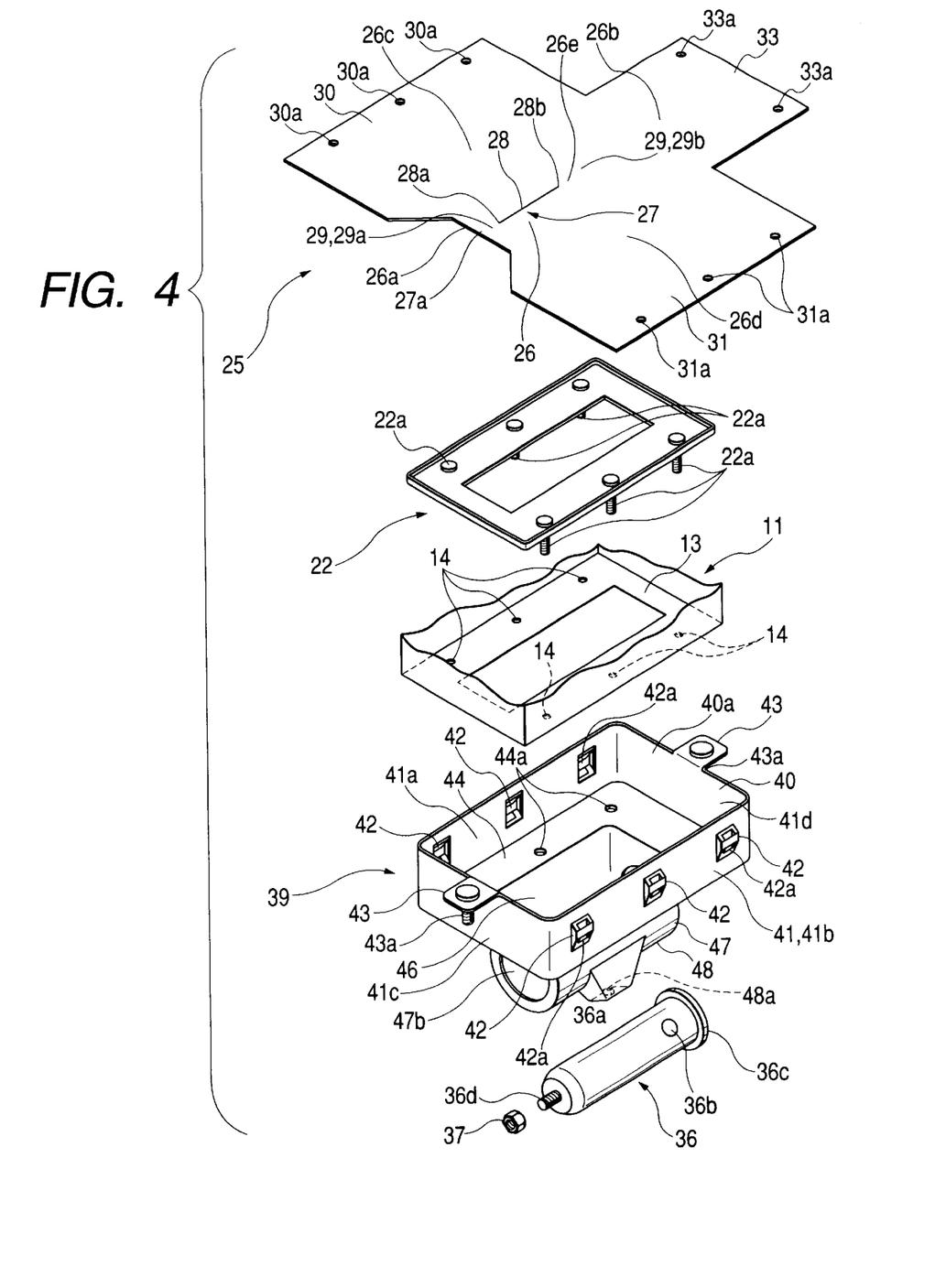
FIG. 4 is a partial exploded perspective view in the same embodiment.
Figure 5:
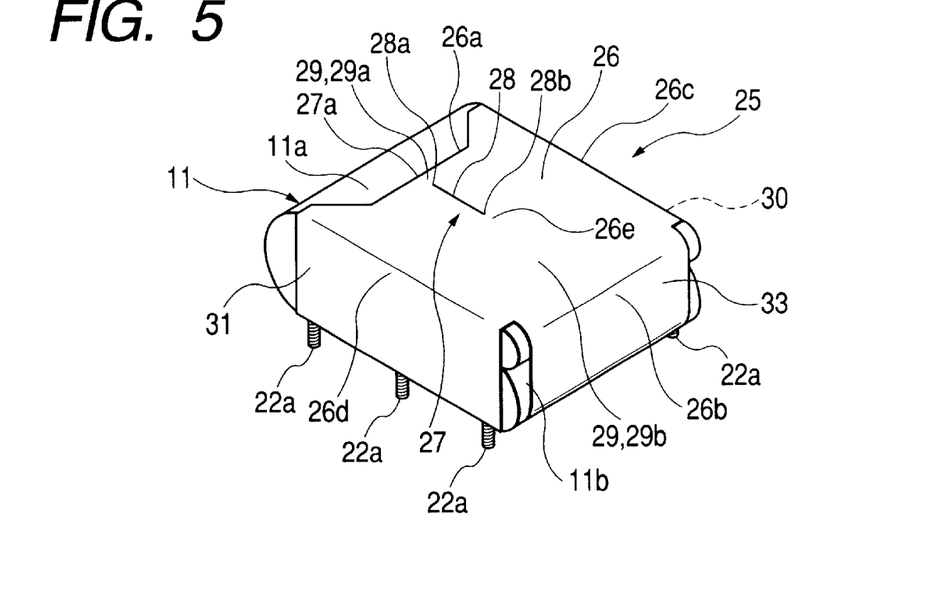
FIG. 5 is a perspective view in the same embodiment, showing the condition in which the sheet encloses the folded air bag.

The sheet 25 is formed from flexible material such as unwoven cloth, woven cloth, a plastic film, etc. (formed from unwoven cloth in this embodiment). As shown in FIGS. 4 and 5, in the state of being developed flat, the sheet 25 is constituted by a regulation wall portion 26 substantially rectangular and disposed in the center, a connection wall portion 30 extending forward from a front edge 26c of the regulation wall portion 26, a connection wall portion 31 extending rearward from a rear edge 26d of the regulation wall portion 26, and an auxiliary wall portion 33 extending rightward from a right edge 26b of the regulation wall portion 26.

When a folded air bag 11 is enclosed by the sheet 25, the regulation wall portion 26 becomes the side from which the air bag 11 projects in case of expansion so as to cover an upper surface 11a of the air bag 11 in a folded state. In the case of the embodiment, a left edge 26a side of the regulation wall portion 26 is concave and a slit 28 is formed such that the slit 28 penetrates the regulation wall portion 26 from the front surface to the back surface in a condition of being offset from the center 26e to the left edge 26a side. This slit 28 constitutes a breakable portion 27 which may be pressed by the air bag 11 in case of expansion so that the regulation wall portion 26 is ruptured.

In the case of this embodiment, when the folded air bag 11 is enclosed by the sheet 25 and mounted on a vehicle, the breakable portion 27 is disposed in the left-right direction of the vehicle. That is, in the case of this embodiment, the breakable portion 27 is arranged so as to run linearly along the left-right direction from the central portion of the left edge 26a of the regulation wall portion 26 in the front-rear direction toward the right edge 26b side of the regulation wall portion 26 through the center 26e of the regulation wall portion 26. The breakable portion 27 in the embodiment is constituted by a slit 28 and a rupture connection portion 29 where no slit 28 is provided. The slit 28 is provided so as to extend in the left-right direction, and the right end 28b is located in the vicinity of the center 26e of the regulation wall portion 26, while the left end 28a is separated a little from the left edge 26a of the regulation wall portion 26, so that, at the time of rupture of the breakable portion 27, the regulation wall portion 26 begins rupture from its left edge 26a side and the rupture runs to the right edge 26b side through the vicinity of the center 26e. The rupture connection portion 29 is constituted by the left connection portion 29a which is located from the center of the left edge 26a of the regulation wall portion in the front-rear direction to the slit left end 28a, and the right connection portion 29b which extends rightward from the slit right end 28b in the left-right direction of the slit 28 to the vicinity of the right edge 26b of the regulation wall portion 26.

Further, attachment holes 30a and 31a into which the bolts 22a of the retainer 22 are fitted respectively are formed respectively at a top end of the connection wall portion 30 extending forward from the regulation wall portion front edge 26c and a top end of the connection wall portion 31 extending rearward from the regulation wall rear edge 26d so as to lock the sheet 25 when the sheet 25 encloses the folded air bag 11. The bolts 22a of the retainer 22 on the front side of the vehicle are inserted through the attachment holes 30a, while the bolts 22a of the retainer 22 on the rear side of the vehicle are inserted through the attachment holes 31a.

The auxiliary wall portion 33 is formed so as to extend rightward from the right edge 26b side of the regulation wall portion 26. The right edge 26b side is an opposite side to the left edge 26a side of the regulation wall portion 26 with the center 26e of the regulation wall portion 26 located between the left edge 26a side and the right edge 26b side. In case of rupture, the left edge 26a becomes the rupture initiation side 27a in the breakable portion 27 of the regulation wall portion 26. Thus, the auxiliary wall portion 33 is configured to cover the right side surface 11b of the folded air bag 11 mounted on the vehicle. Two attachment holes 33a are formed in the top end of the auxiliary wall portion 33 so that the two, front and rear, bolts 22a of the retainer 22 on the right side of the vehicle can be fitted to the attachment holes 33a, while covering the right side surface 11b of the folded air bag 11 and locking the folded air bag 11.

Figure 8A:
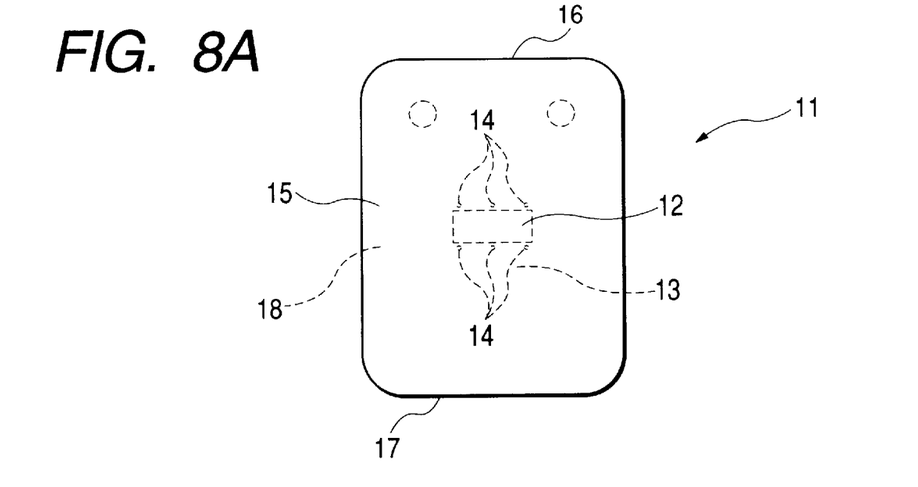
FIGS. 8A, 8B and 8C are views in the same embodiment, showing steps of folding the air bag.

Next, the assembling of the air bag device M will be described. In the state that the retainer 22 is arranged inside while the bolts 22a are projected out from the attachment holes 14, the air bag 11 is folded. This folding operation is as follows. In the case of the embodiment, first, the air bag 11 is developed flat so that the passenger side wall portion 15 which faces the passenger upon completion of expansion of the air bag 11 is made to close to the opening circumferential edge side wall portion 18 on the opening 12 side, as shown in FIG. 8A.

Figure 8B:
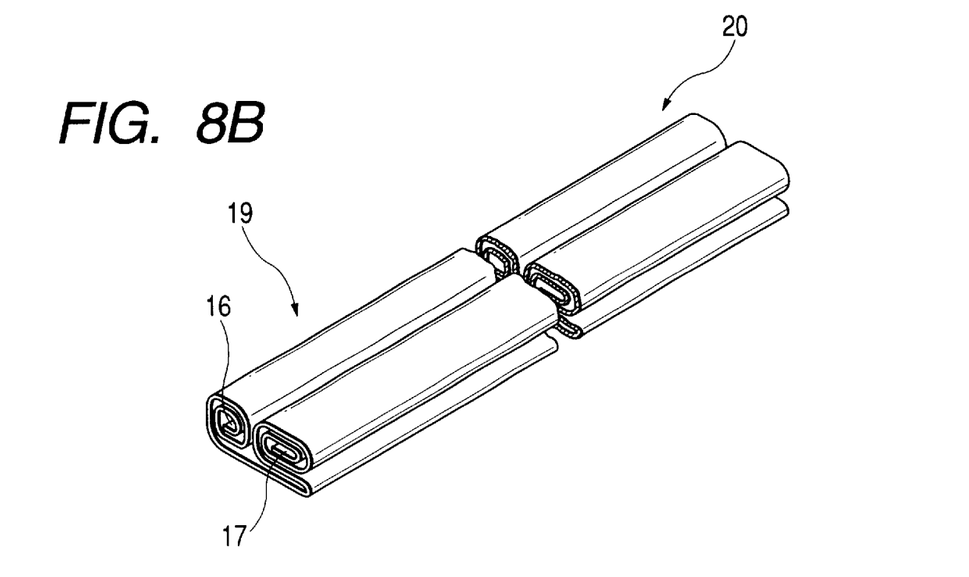

Next, the air bag 11 is transversely folded, as shown in FIG. 8B, so as to make the flattened upper edge 16 side and the lower edge 17 side come near the opening 12. In the case of the embodiment, the upper edge 16 side is rolled so as to come near the opening 12 on the passenger side wall portion 15, while the lower edge 17 side is rolled so as to come near the opening 12 on the opening circumferential edge side wall portion 18. Further, both of two rolled portions are folded so as to be mounted on the passenger side wall portion 15 side.

Figure 8C:
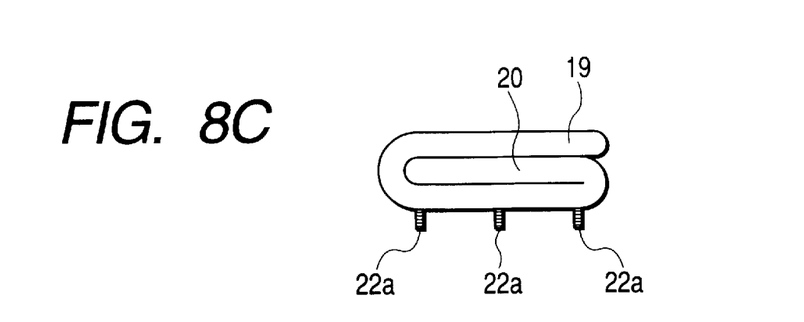

After the transverse folding, as shown in FIG. 8C, vertical folding is conducted such that the right folded portion 20 which is transversely folded is further folded back to the opening 12 side and the left folded portion 19 which is transversely folded is further folded back on the right folded portion 20. As a result, the folding of the air bag 11 is completed.

Thereafter, as shown in FIG. 5, the regulation wall portion 26 is disposed on the upper surface 11a of the folded air bag 11, the bolts 22a of the retainer 22 are correspondingly fitted in the attachment holes 30a, 31a, and 33a, and the folded air bag 11 is enclosed by the sheet 25, while preventing the air bag 11 from unfolding when in a non-deployed state. At this time, the left edge 26a side of the regulation wall portion 26 is disposed on the left side of the air bag 11 mounted on the vehicle, so that the lower surface of the regulation wall portion 26 abuts on the upper surface of the left folded portion 19, and the auxiliary wall portion 33 abuts on the right side surface 11b of the folded air bag 11.

Further, the inflator 36 is accommodated and held in the lower chamber 46 of the casing 39. The assembling of the inflator 36 to the lower chamber 46 may be carried out after connection of the cover 53 to the casing 39 and immediately before the assembling of the air bag device M.

Then, the folded air bag 11 is accommodated in the upper chamber 40 from the opening 40a so that the bolts 22a of the retainer 22 are projected out from the through holes 44a of the casing 39. Further, from the above, the side wall portions 58 and 59 of the cover 53 are outer inserted onto the upper chamber 40, and the lock protrusions 42 on the front and rear side wall portions 41a and 41b are inserted into the lock holes 58a of the side wall portions 58 respectively.

Next, the insert portions 51d are inserted into insertion holes 42a of the lock protrusions 42 projecting from the side wall portions 58, and the bolts 22a are inserted into the through holes 51b. The pressing members 51 and 51 are disposed in the front and rear portions of the casing 39. Further, if nuts 23 are thread-engaged with the bolts 22a, the assembling operation of the air bag device M can be completed.

The thus assembled air bag device M is inserted into the opening 2 of the instrument panel 1 assembled to the vehicle; the lock legs 57 are locked to the flange portion 3; the bolts 43a are inserted into the connection holes 3a and thread-engaged with the nuts 4 to thereby connect the flange portions 43 to the instrument panel 1; and the bolt 9 is thread-engaged with the nut 48a through the connection hole 8a of the bracket 8 so that the casing 39 is connected to the body 6. Thus, the air bag device M can be mounted on the vehicle.

If the expansion gas is discharged from gas delivery ports 36b of the inflator 36 after the air bag device M is mounted on the vehicle, the air bag 11 is expanded, and the breakable portion 27 in the regulation wall portion 26 of the sheet member 25 is ruptured and the breakable portion 56 of the cover 53 is also ruptured so that the door portions 55 and 55 are opened as shown by the chain double-dashed line in FIGS. 1 and 2. The air bag 11 as a result primarily projects upwardly from the opening 40a of the casing upper chamber 40, and then projects toward the vehicle rear side along the windshield W.

Figure 6:
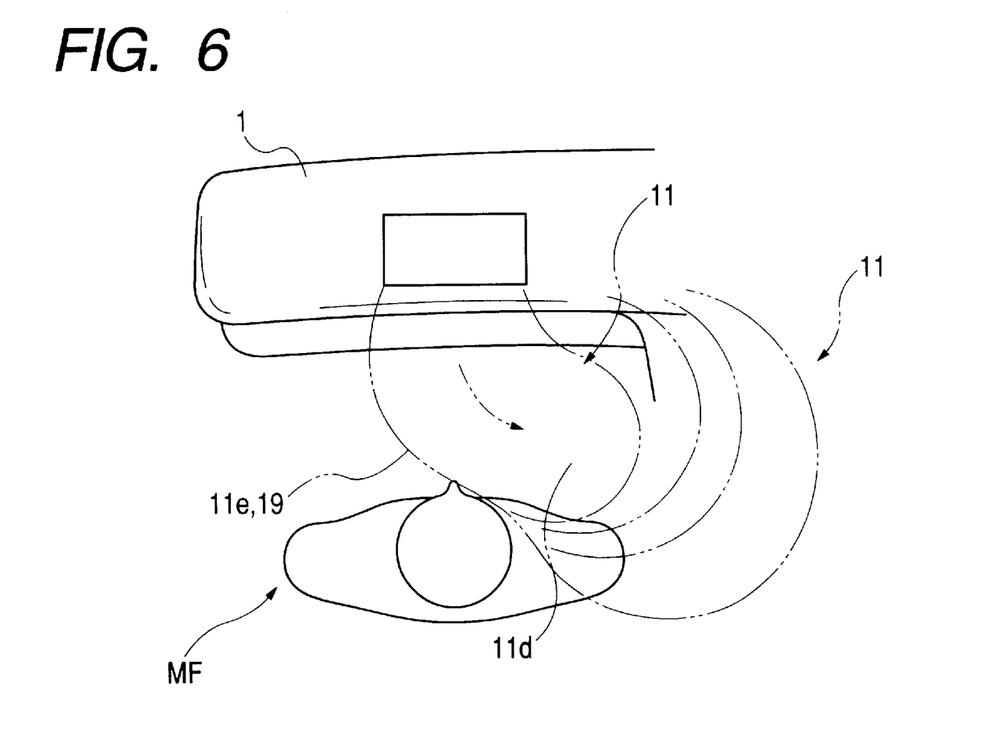
FIG. 6 is a plan view in the same embodiment, showing the condition of use in which a passenger sits in the normal position.

In the embodiment, the regulation wall portion 26 of the sheet 25 is arranged to cover the upper surface 11a of the air bag 11 in the upper side from which the air bag 11 projects in case of expansion. Further, the breakable portion 27 is provided in the regulation wall portion 26 so as to be ruptured from the left edge 26a side of the regulation wall portion 26 to the right edge 26b side through the vicinity of the center 26e. Accordingly, in the initial stage of development and expansion, the air bag 11 projects not in a mode in which the air bag 11 projects from the vicinity of the center 26e of the regulation wall portion 26, but in a mode in which the air bag 11 projects, during deployment from the left edge 26a, which is the rupture initiation side 27a, of the circumferential edge sides of the regulation wall portion 26. The projecting position 11d of the air bag 11 at this time works as follows. As shown in FIG. 6, the air bag 11 projects, while a side opposite to the rupture initiation side 27a in the breakable position 27 has not yet unfolded, not toward the passenger side, but in a bent state as if the air bag 11 is pulled to the right side which is opposite to the rupture initiation side 27a in the breakable portion 27.

As shown in FIG. 6, therefore, even if the passenger MF is positioned in the normal seating position, the air bag 11 projects right with respect to the passenger MF in a bent state so as to avoid directly impacting the passenger MF in the initial stage of development and expansion. Therefore, the air bag 11 does not impose any large pressing force on the passenger MF seated in the normal position. Thereafter, the breakable portion 27 of the regulation wall portion 26 is ruptured from the left edge 26a side to the vicinity of the right edge 26b through the center 26e to thereby complete the rupture. Accordingly, the air bag 11, is completely unfolded with the completion of rupture in the breakable portion 27, so that the expansion is completed in a condition that the right side of the air bag 11 is expanded largely while the left side surface portion 11e of the air bag 11 is in contact with the passenger MF.

Figure 7:
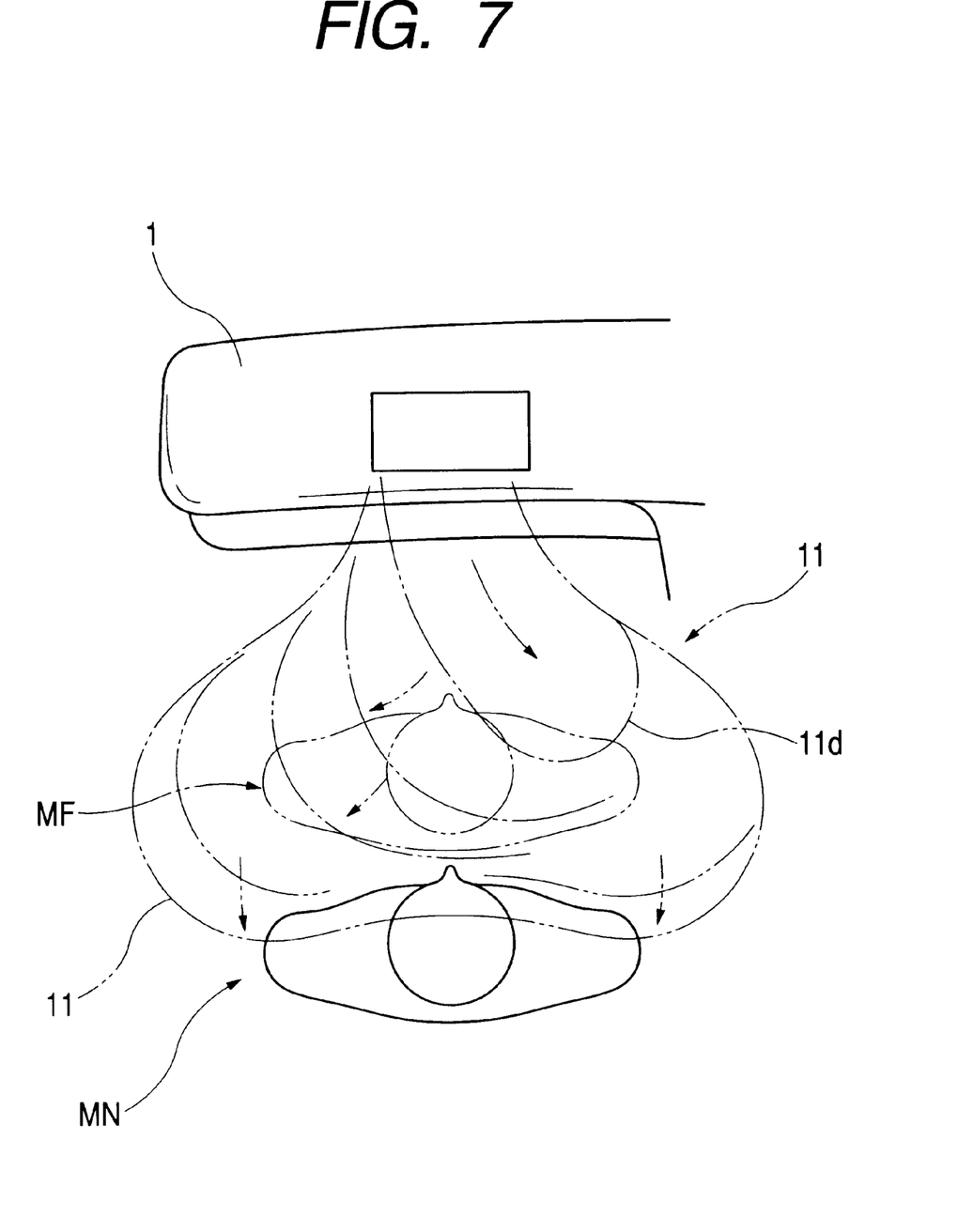
FIG. 7 is a plan view in the same embodiment, showing the condition of use in which a passenger sits in the normal position.

In the case where the passenger MN seats in a proper or normal position, as shown in FIG. 7, even if the air bag 11 is made to project with the projection portion 11d bent rightward in the initial stage of the development and expansion, the projection portion 11d does not come into contact with the passenger MN. In such a manner, when the air bag 11 is completely unfolded with the completion of the rupture of the breakable portion 27, the development of the air bag 11 is conducted while the projection position 11d is shifted leftward. In this condition, the air bag 11 is then expanded toward the passenger MN. As a result, the air bag 11 restricts the passenger MN accurately after the development and the expansion of the air bag 11 are completed.

Accordingly, in the air bag device M in the embodiment, even if the passenger MF sits in the normal position, the pressing force against the passenger MF in development and expansion of the air bag 11 can be reduced. Further, the member for providing the operations and effects as mentioned above is the sheet 25 which is a constituent component in the conventional air bag device M for preventing the air bag 11 from unfolding when in a non-deployed state. Accordingly, the air bag device M according to the embodiment can be produced very conveniently.

In the embodiment, there is shown the case where the rupture starts from the left edge 26a of the regulation wall portion 26 to the center 26e side thereof so that the regulation wall portion 26 is ruptured from the left side of the folded air bag 11. The breakable portion 27 may be, however, designed to be ruptured from one of the right edge side, the upper edge side, or the lower edge side of the regulation wall portion 26 as the rupture initiation side, to the vicinity of the edge opposite to the rupture initiation side through the vicinity of the center 26e. For example, the connection portions 30 and 31 may be disposed in the left and right sides of the regulation wall portion 26 and the sheet 25 may be designed so that rupture is started from the upper or lower edge side of the regulation wall portion 26.

In the embodiment, however, the breakable portion 27 of the regulation wall portion 26 is designed to be ruptured from the left edge 26a side of the regulation wall portion 26 mounted on the vehicle, when the air bag is expanded. In the initial stage of development and expansion, as shown in FIG. 6, the air bag 11 projects rightward in a bent state to avoid directly impacting the passenger MF sitting the normal position so that the fear of interference with the passenger MF is reduced, compared with the case where the air bag projects toward the upper side or the like. Taking this point into consideration, even if the breakable portion 27 is configured in such a manner that the left and right sides of the sheet 25 are reverse to each other so that the rupture starts from the right edge 26b side of the regulation wall portion 26 mounted on the vehicle, to the vicinity of the left edge 26a side through the vicinity of the center 26e, the same operation and effects can be obtained.

Further, in the embodiment, the breakable portion 27 of the sheet 25 is constituted by the slit 28 which is offset from the center to the left edge 26a side of the regulation wall portion 26. That is, the slit is simply formed in the regulation wall portion 26. In comparison with the conventional case where the breakable portion 27 is formed by stitching by use of threads or the like, the breakable portion 27 can be produced easily by a simply means of forming the slit by cutting a rift by use of a cutter, or the like.

Figure 9:
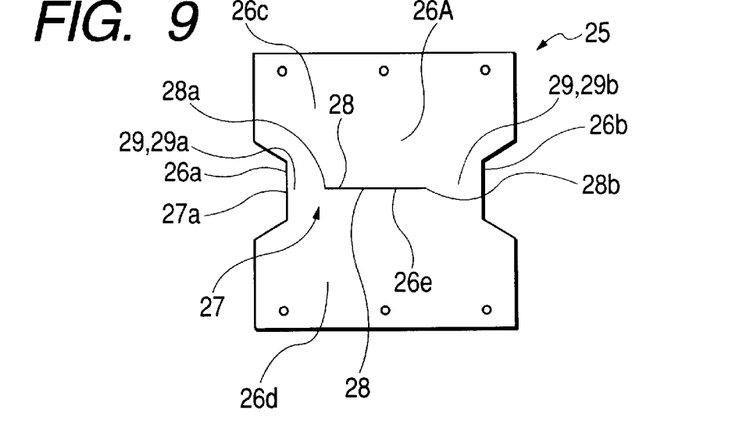
FIG. 9 is a plan view of a sheet in another embodiment.
Figure 10:
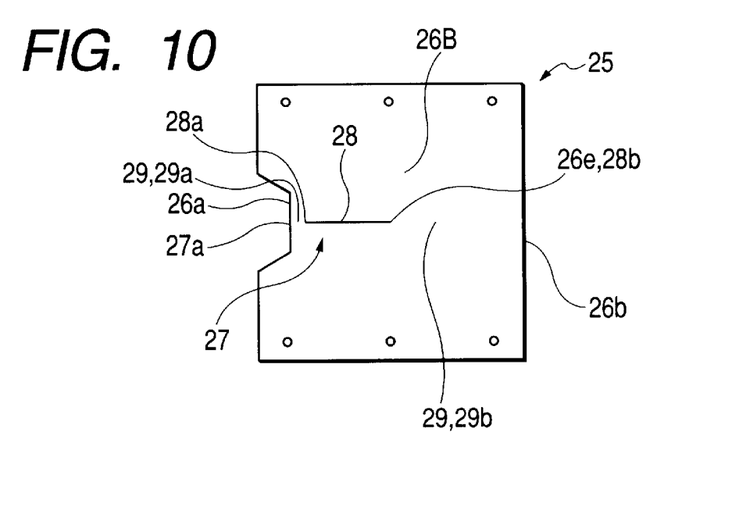
FIG. 10 is a plan view of the sheet in a further embodiment.
Figure 11:
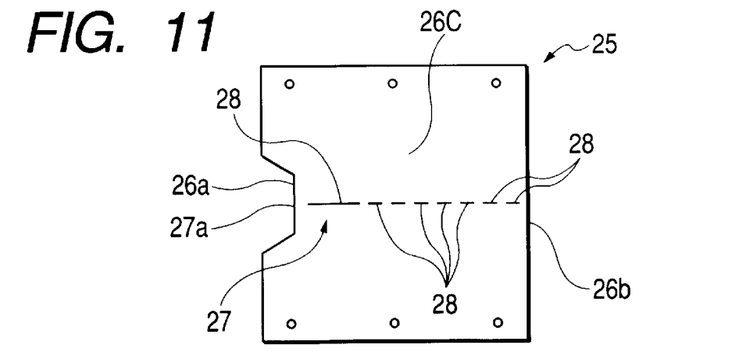
FIG. 11 is a plan view of the sheet in a still further embodiment.

In the case where the breakable portion 27 is formed by using a slit, for example, in the case where rupture starts from the left edge 26a side of the regulation wall portion 26 to the vicinity of the center 26e, like the regulation wall portions 26A and 26B shown in FIGS. 9 and 10, the left connection portion 29a of the rupture connection portion 29 provided on the left side of the slit 28 may be formed to be shorter than the right connection portion 29b provided on the right side of the slit 28. Alternatively, like the regulation wall portion 26C shown in FIG. 11, a plurality of slits 28 may be provided so that rupture starts from the left edge 26a side rather than the right edge 26b side.

Further, in the embodiment, when the air bag 11 is developed and expanded, the folded portion 19 folded and superimposed on the upper side projects out first. At that time, the folding potion 19 folded and superimposed on the upper side ruptures the rupture initiation side 27a of the regulation wall portion 26 rapidly. Therefore, the mode in which the air bag 11 projects out in a bent state from one edge 26a of the circumferential edges of the regulation wall portion 26 so as to avoid directly impacting the passenger can be obtained accurately and stably. Of course, in the case where the right edge 26b side of the regulation wall portion 26 is made to be the rupture initiation side 27a of the breakable portion 27, the right folded portion 20 may be folded and superimposed on the upper side of the left folded portion 19.

Furthermore, in the embodiment, the sheet 25 is connected to the edge 26b of the regulation wall portion 26 in opposition to the rupture initiation side 27a and the sheet 25 is provided with the auxiliary wall portion 33 which covers the side surface 11b of the air bag 11 on the side perpendicular to the side from which the air bag 11 projects. Accordingly, in the initial stage of the development and expansion of the air bag 11, the air bag 11 is restricted by the auxiliary wall portion 33 so as not to project out from the side opposite to the rupture initiation side 27a of the regulation wall portion 26. The mode in which the air bag 11 projects out in a bent state from the left edge 26a of the circumferential edges of the regulation wall portion 26 so as to avoid directly impacting the passenger can be obtained further accurately and stably. Of course, in the case where the right edge 26b side of the regulation wall portion 26 is made to be the rupture initiation side 27a of the breakable portion 27, the auxiliary wall portion 33 may be formed to cover the left side surface 11c of the folded air bag 11.

Figure 12:
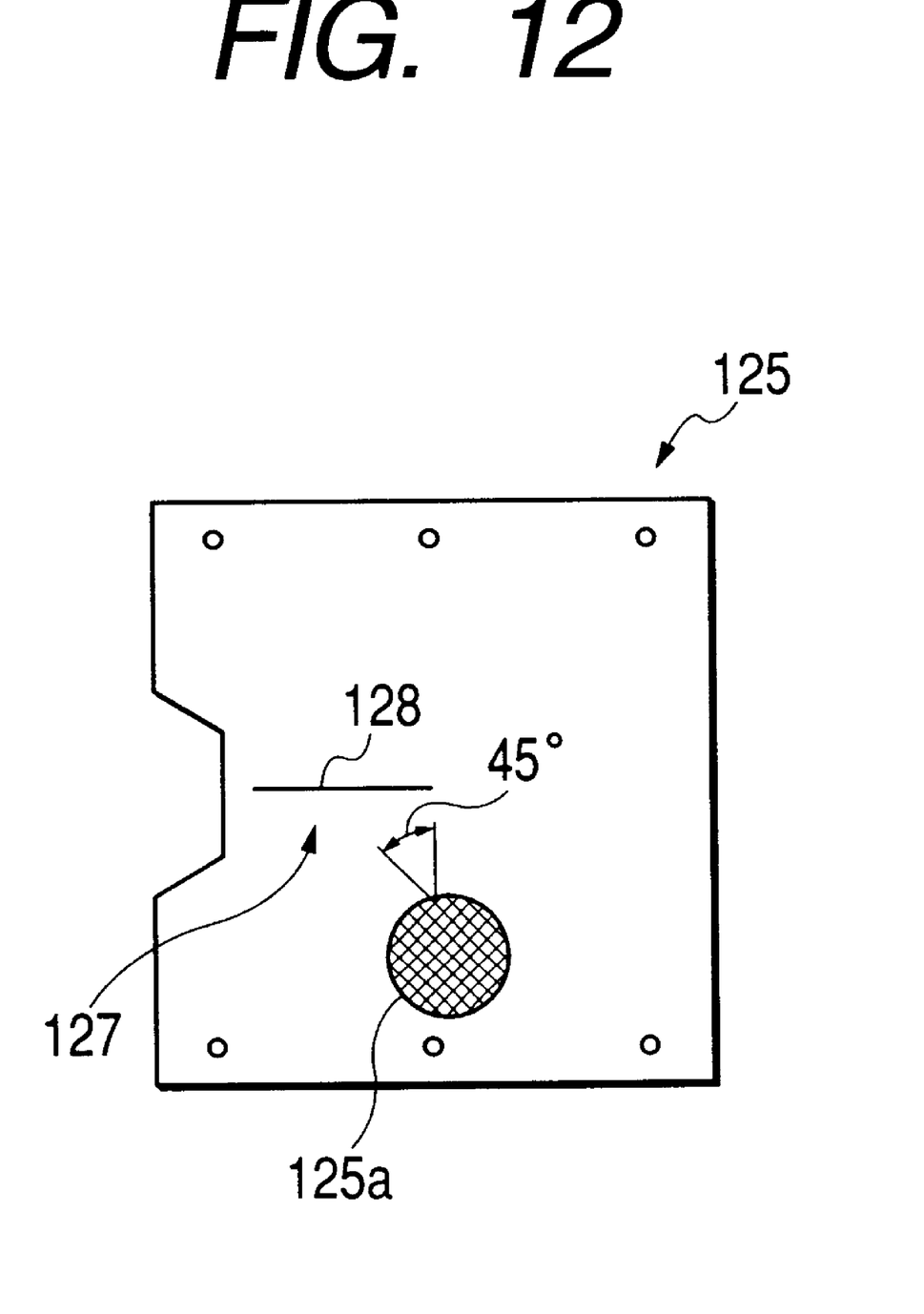
FIG. 12 is a plan view of the sheet in a still further embodiment.

Although the sheet 25 is provided as unwoven cloth in the above embodiments, the sheet can be formed from a woven cloth. As shown in FIG. 12, the sheet 125 is formed from a woven cloth 125a with a lattice pattern. In that case, it is desirable that fibers of the woven cloth 125a are oriented so as to form a bias angle with respect to the slit 128 as shown in FIG. 12. Preferably, the bias angle is an angle of 45 degrees with respect to the slit 128. By such the orientation of the woven cloth 125, the sheet 125 can be ruptured more easily and reliably in a breakable portion 127 in left-right direction when the air bag 11 is expanded.

What is claimed is:

1. An air bag device having a folded air bag therein comprising:

a sheet for enclosing said air bag in a folded state and for preventing said air bag from unfolding when in a non-deployed state;

a regulation wall portion provided on said sheet and covering a surface of said air bag on a side from which said air bag projects when said air bag is expanded; and a breakable portion being offset to one of a left edge side and a right edge side of said regulation wall portion so as to be ruptured by said air bag beginning from said one of a left edge side and a right edge side of said regulation wall portion when said air bag is expanded wherein:

folding of said air bag is completed when folded portions of said air bag extending in a left-right direction are folded and superimposed onto a center part of said air bag; and one of a left folded portion and said a right folded portion is folded and superimposed on another of said left folded portion and said right folded portion on a rupture initiation side in said regulation wall portion.

2. An air bag device according to claim 1, wherein said breakable portion is formed as a slit provided on said regulation wall portion, said slit forming a rupture initiation side.

3. An air bag device according to claim 2, wherein:

said sheet is provided with an auxiliary wall portion, which is connected to said regulation wall portion and which covers a surface of said air bag on a side perpendicular to a side from which said air bag projects; and said auxiliary wall portion is connected to an edge side of said regulation wall portion in opposition to said rupture initiation side.

4. An air bag device having a folded air bag therein comprising:

a sheet for enclosing said air bag in a folded state and for preventing said air bag from unfolding when in a non-deployed state;

a regulation wall portion provided on said sheet and covering a surface of said air bag on a side from which said air bag projects when said air bag is expanded; and a breakable portion being offset to one of a left edge side and a right edge side of said regulation wall portion so as to be ruptured by said air bag beginning from said one of a left edge side and a right edge side of said regulation wall portion when said air bag is expanded, wherein:

said breakable portion is formed as a slit provided on said regulation wall portion, said slit forming a rupture initiation side; and said sheet is provided as a woven cloth with a lattice pattern, and said woven cloth is oriented so as to form a bias angle with respect to said breakable portion formed as a slit.

* * * * *